(12) United States Patent
Prakah-Asante et al.

(10) Patent No.: US 6,708,095 B2
(45) Date of Patent: Mar. 16, 2004

(54) METHOD FOR ROBUST OCCUPANT POSITION CONTROL PRIOR TO VEHICLE IMPACT

(75) Inventors: Kwaku O. Prakah-Asante, Commerce Township, MI (US); Kenneth Nero Morman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 10/052,796

(22) Filed: Jan. 23, 2002

(65) Prior Publication Data

US 2003/0139865 A1 Jul. 24, 2003

(51) Int. Cl.$^7$ ............................................... B60R 22/48
(52) U.S. Cl. ....................................................... 701/45
(58) Field of Search ....................... 701/45; 280/801.1, 280/727, 728.1, 728.2, 730.1, 734, 735; 342/72

(56) References Cited

U.S. PATENT DOCUMENTS

| | | |
|---|---|---|
| 3,735,398 A | 5/1973 | Ross |
| 3,745,572 A | 7/1973 | Sato et al. |
| 3,789,950 A | 2/1974 | Strenglein |
| 3,982,775 A | 9/1976 | Lindblad |
| 5,552,986 A | 9/1996 | Omura et al. |
| 5,664,807 A * | 9/1997 | Bohmler .................. 280/805 |
| 5,785,347 A | 7/1998 | Adolph et al. |
| 5,906,393 A | 5/1999 | Mazur et al. |
| 5,936,549 A | 8/1999 | Tsuchiya |
| 6,161,439 A | 12/2000 | Stanley |
| 6,463,372 B1 * | 10/2002 | Yokota et al. ............... 701/45 |

FOREIGN PATENT DOCUMENTS

JP      2001-225723     *   8/2001     ........... B60R/22/46

* cited by examiner

Primary Examiner—Thu V. Nguyen
(74) Attorney, Agent, or Firm—Frank A. MacKenzie (57) ABSTRACT

A method for robust occupant position control prior to vehicle impact is provided. The method includes, in response to detecting an object, generating a Collision Index (CI) value representing a likelihood of collision with the detected object, and generating a Lateral Displacement (LD) value indicative of a distance to the detected object. A weight value ($W_o$) for a vehicle occupant is also determined. When the CI and LD values exceed respective thresholds, the method generates a pretensioner output ($PT_{out}$) value as a function of the CI and $W_o$ values, and activates a seatbelt pretensioner associated with a seat of the vehicle occupant as a function of the $PT_{out}$ value. An occupant positioning system for a vehicle activated prior to vehicle impact is also provided.

17 Claims, 5 Drawing Sheets

METHOD FOR ROBUST OCCUPANT POSITION CONTROL PRIOR TO VEHICLE IMPACT

TECHNICAL FIELD

The present invention relates to occupant position control systems, and more particularly, concerns a method for robust occupant position control prior to vehicle impact.

BACKGROUND OF THE INVENTION

Automotive manufacturers have incorporated sensing systems and restraint actuators to improve occupant safety. For example, current vehicles typically employ solid-state impact accelerometers to sense decelerations acting upon the vehicle body. In response to the accelerometer outputs, airbags or other safety devices are deployed. Front airbags, side airbags, and seatbelt pretension systems, for instance, play an important role in achieving desired safety performance. In order to achieve optimal functionality, the active restraint systems are required to deploy at appropriate times and must be well coordinated to meet related safety objectives including minimizing head and chest decelerations, upper neck forces and moments, and chest deflections. The seatbelt pretensioner, for example, removes the slack in the seatbelt webbing. This is instrumental in keeping the vehicle occupant in the seat prior to the deployment of airbags or other safety devices.

Current vehicles typically employ solid-state impact accelerometers to sense decelerations acting upon the vehicle body. Sensing algorithms analyze the accelerometer data to evaluate early crash conditions and determine safety device deployment schemes. Integrating the safety restraint systems with accelerometer-based crash sensing systems, improves the overall vehicle safety.

In certain circumstances, however, it would be desirable to provide information from predictive sensors before a vehicle collision such that safety countermeasures can be activated when a collision is inevitable. In this regard, it would be desirable to have reversible seatbelt pretensions to establish the position of an occupant prior to a collision based on information from predictive sensors regarding an imminent crash situation.

It would also be desirable to have an effective, active manipulation of seatbelt pretensioners to achieve improved coordinated injury mitigation with other safety devices such as airbags. It would also be desirable to have an intelligent active pretensioner mechanism, a redundant backup strategy for the pretensioner activation, a reliable pre-crash predictive sensing system, and knowledge of occupant characteristics such as size, weight and position for an improved coordinated injury mitigation scheme. Therefore, there is a need in the art to provide a method for robust occupant position control prior to vehicle impact to accomplish these desires.

SUMMARY OF THE INVENTION

The present invention, accordingly, provides a predictive collision sensing system and seatbelt pretensioner control scheme to provide robust occupant position control prior to vehicle impact.

In one aspect of the invention, a method for positioning occupants of a reference vehicle is provided. The method includes, in response to detecting an object, generating a Collision Index (CI) value representing a likelihood of collision with the detected object and the speed dependent severity, and generating a Lateral Displacement (LD) value indicative of a distance to the detected object. A weight value ($W_o$) for a vehicle occupant is also determined. When the CI and LD values satisfy respective threshold conditions, the method generates a pretensioner output ($PT_{out}$) value as a function of the CI and $W_o$ values, and activates a seatbelt pretensioner associated with a seat of the vehicle occupant as a function of the $PT_{out}$ value.

In another embodiment a pre-crash occupant positioning system for a vehicle is provided. The system includes an object detector for providing a speed and distance to a detected object, a weight sensor associated with an occupant seat for providing an occupant weight value ($W_o$), and a seatbelt pretensioner responsive to a pretensioner control signal ($PT_{out}$) for tensioning a seat belt associated with the occupant seat. A Predictive Impact Estimator (PIE) generates a Collision Index (CI) value as a function of the closing velocity and object distance values. A Pretensioner Control Module (PCM) receives the CI and $W_o$ values, generates a $PT_{out}$ value as a function of the CI and $W_o$ values, and communicates the $PT_{out}$ value to the seatbelt pretensioner.

One advantage of the present invention is that activation of the seatbelt pretensioner system prior to a collision is based on a predicted collision index, and the occupant position can be established before a potential collision occurs. Another advantage of the present invention is that the method for robust occupant position control prior to vehicle impact provides an activation signal to a reversible pretensioner which is dynamically regulated by accounting for occupant characteristics, including weight, to assure the appropriate amount of load is applied to the occupant. Yet another advantage of the present invention is that it provides a signal to a back-up passive pretensioner as to the status of the active pretensioner manipulation. A further advantage of the present inventions is that a confirmation signal is sent to the airbag RCM with the collision index level to assist in multistage air-bag activation based on threshold CI levels, should a collision occur. Yet another advantage of the present invention is that thresholds for activating the pretensioner are tunable based on the collision index value to minimize nuisance manipulation, and to recommend on what safety device to deploy before/after the collision.

Other advantages and features of the invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
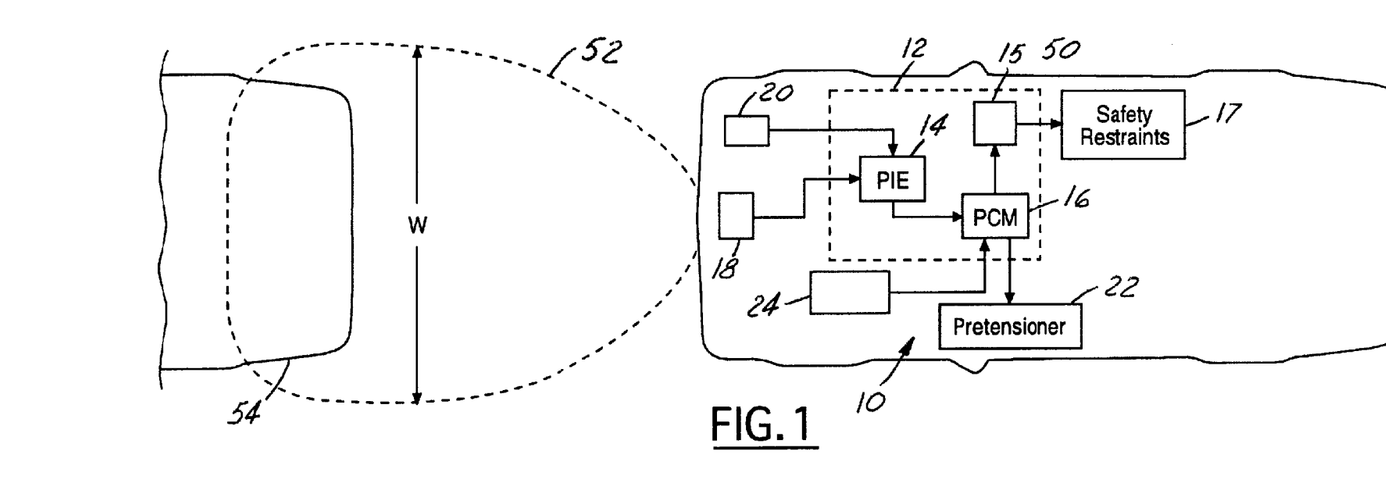
FIG. 1 is a block diagram view of a robust occupant position control system according to one embodiment of the present invention.

Referring now to FIG. 1 there is shown a block diagram view of a robust occupant position control system according to an embodiment of the present invention. The present invention provides a system and method for decision making using predictive collision information from object detecting systems such as radar or laser-radar sensors for robust resettable pretensioner restraint performance. As shown in FIG. 1, a reference vehicle 50 is illustrated having an object detection zone in front thereof. The object detection zone 52 has a width w, which is approximately commensurate with the width of the vehicle 50 and is positioned in front of the reference vehicle 50. The size of the object detection zone is a function of the detection sensing system for the particular vehicle 50. A detected object 54 such as another vehicle is illustrated as encroaching upon the object detection zone 52. When an object enters the detection zone 52, the present invention is activated to determine a potential risk of the obstacle 54 colliding with the reference vehicle 50 and make pretensioner activation decisions based thereon.

The robust predictive occupant position control system 10 has a controller 12. Controller 12 is preferably a microprocessor-based controller having associated memory, inputs, outputs, and a communication bus. The memory may comprise various types of memory as is known in the art including read-only memory, random access memory and keep alive memory. The controller 12 may be part of the electronic engine control module of the vehicle 50 or may comprise a separate controller. The controller 12 includes three functional control blocks including a predictive impact estimator (PIE) 14, a pretensioner control management (PCM) system 16 and a conventional accelerometer based controller 15 for deploying safety restraints 17 based upon early crash data. Although the PIE 14 and PCM 16 are shown as part of the controller 12, those skilled in the art will recognize that they could also comprise separate components.

An object sensing system 18 is coupled to the controller 12 and specifically the PIE 14. The object sensing system 18 generates an object signal in the presence of an object (such as vehicle 54) within the object detection field of view 52. Object sensing system 18 may comprise one or a number of types of sensors including radar, lidar, laser-radar, and optical vision systems. Optical vision systems may comprise one or more cameras or CCD type devices. Both radar and lidar, are capable of sensing the presence and the distance of an object from the vehicle 50. When used as a stereo pair, optical cameras acting together are also capable of detecting the distance of an object from the vehicle.

Vehicle trajectory sensors 20 are also coupled to the controller 12 and specifically the PIE 14 for providing direction and velocity information regarding the reference vehicle 50. The reference vehicle trajectory information coupled with the detected object position is used to determine if the object is in the pathway of the vehicle. The trajectory sensors 20 include a speed sensor which may be one of a variety of speed sensors known to those skilled in the art. For example, a suitable speed sensor may include a sensor at every wheel that is averaged by controller 12 or PIE 14. The controller would then translate the wheel speeds into the speed of the vehicle. Suitable type speed sensors may include for example toothed-wheel sensors such as those employed in anti-lock brake systems.

Vehicle trajectory sensors 20 also include reference vehicle directional sensing capabilities such as those provided by a yaw rate sensor or a steering wheel angle sensor. A yaw rate sensor preferably provides the yaw rate of the vehicle about the center of gravity of the vehicle. Yaw rate measures the rotational tendency of the vehicle about an axis normal to the surface of the road. Although a yaw rate sensor is preferably located at the center of gravity, those skilled in the art will recognize that the yaw rate sensor may be located in various locations of the vehicle and translated back through the center of gravity either at the yaw rate sensor or through calculations within controller 12 in a known manner. The steering wheel angle sensor provides the steering wheel angle signal to the controller 12. The steering wheel angle signal corresponds to the steering wheel angle of the hand wheel of the automotive vehicle. A yaw rate sensor alone or a steering wheel sensor alone, or the two in combination, may be used to indicate the direction of travel of the reference vehicle 50.

The predictive impact estimator 14 and the pretensioner control management system 16 are the primary systems for coordinating active manipulation of the seatbelt pretensioners 22. The pretensioners 22 are any pretensioner system known to those of skill in the art for removing slack in the seatbelt webbing and securing an occupant in their respective seat. The PIE 14 receives vehicle speed and directional data from the trajectory sensor system 20 as well as the closing speed, range and impact direction of the detected object 54 from the object sensing system 18 which is preferably a radar sensing system. The PIE 14 processes information regarding the obstacle direction range and closing speed to make decisions on the potential risk of the obstacle colliding with the host vehicle 50. The output of the PIE is an impact condition specified by a collision index (CI) generated from fuzzy logic computations, and the relative lateral displacement (LD) of the obstacle 54 from the host vehicle 50.

The collision index value and the obstacle kinematics including the LD of the obstacle is translated to the PCM 16 which processes this information as described below to govern the deployment of pretensioner 22. The PCM 16 also receives data from occupant characteristics sensors 24 which detect at least the weight of each vehicle occupant to ensure the desired amount of pretensioning load is applied to the respective occupant seatbelt. Occupant characteristic sensors 24 may also include occupant location sensing systems to determine the position of each respective occupant in the vehicle 50 to govern deployment of the pretensioner 22. The deploy status of the active pretensioner is also communicated to the accelerometer based controller 15 along with the CI value generated by the PIE 14 to assist in multi-stage airbag activation if the vehicle is so equipped. As discussed in more detail below, thresholds for activating the pretensioner 22 are tunable based on the collision index value to minimize nuisance manipulation. In addition, a reliability indicator of the object detection system 18 data is taken into account and the PCM computations to activate the pretensioner 22.

In one embodiment, a radar system is used as the object detecting system 18 to obtain information about the range, closing speed and direction of impact with the detected object 54. The radar sensors are located in the front of the reference vehicle 50. Predictive collision information could also be collected for regions to the side of and rearward of the reference vehicle 50 in a like manner. A detected object zone 52 of 20 meters in length, for example, from the front of the vehicle 50 initiates the PIE and PCM.

In operation, the PIE logic determines a potential for a collision to occur between the obstacle 54 and the reference vehicle 50. The PIE logic routine incorporates a fuzzy logic rule inference system to determine an output collision index value. The CI value is indicative of the relative potential for an impact to occur based upon the input obstacle velocity and range information as communicated by detecting system 18 and trajectory system 20. When an obstacle is detected within the object detection zone 52, the PIE logic routine determines the potential for a collision to occur and assigns a CI value between 0 and 10. Describing the range and velocity inputs from radar system 18 in fuzzy terms allows the PIE 14 to smoothly respond to changes in range and velocity inputs.

Figure 2:
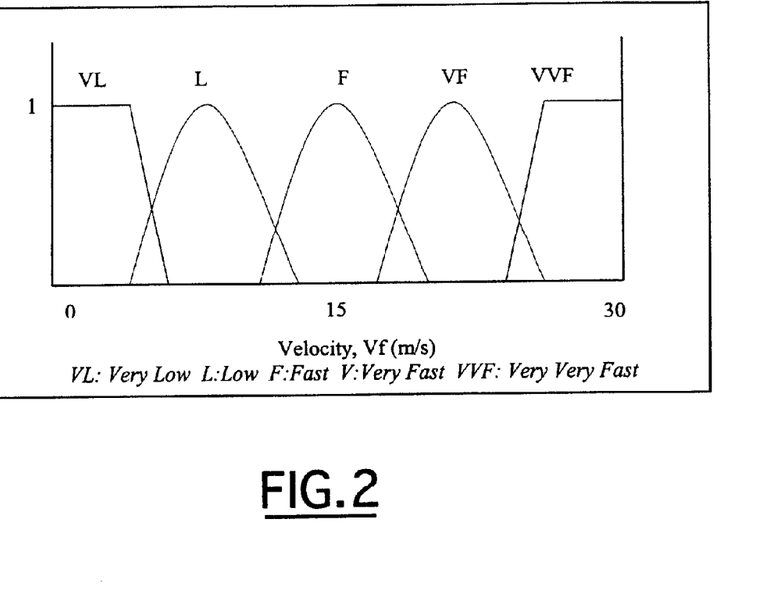
FIG. 2 is a graph of detected object input velocity membership functions for the predictive impact estimator of FIG. 1.

For example, FIG. 2 shows a graph of velocity membership functions used to transform the range and velocity inputs as received from sensing system 18 into fuzzy logic terms. As shown in FIG. 2, the velocity term is divided into quintiles representing respectively velocities which are very low (VL), low (L), fast (F), very fast (VF), and very, very fast (VVF).

Figure 3:
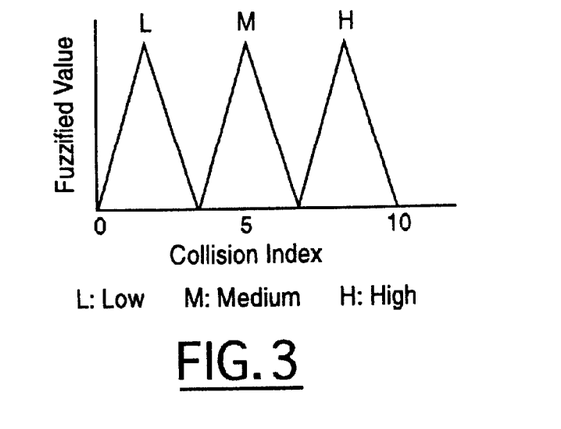
FIG. 3 is a graph of the collision index output membership functions of the predictive impact estimator of FIG. 1.

Referring now to FIG. 3 there is shown a graph of impact condition membership functions which are used to represent the CI for determining the potential for a crash to occur. As shown in FIG. 3, the collision index range of 0 to 10 results in three membership functions representing low (L), medium (M), and high (H) potential for impact with the detected object.

Figure 4:
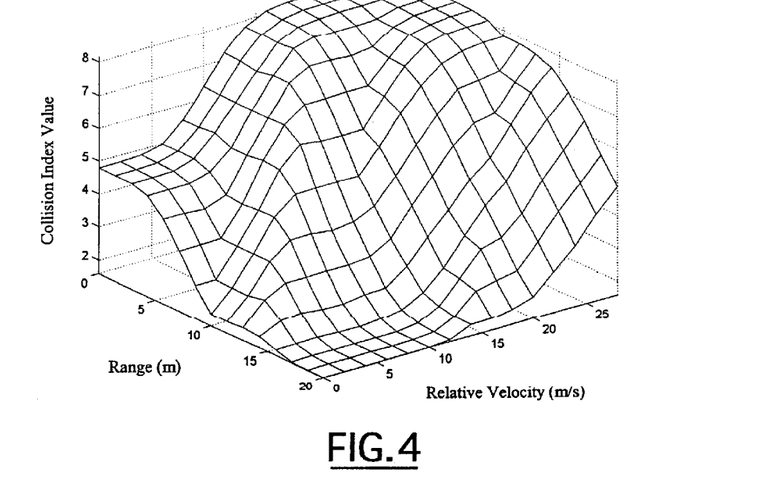
FIG. 4 is a predictive impact estimator output surface response plot depicting relative velocity, range and collision index values.

Referring to FIG. 4, a surface plot of the CI values obtained from fuzzy computation of the velocity and range values from 0–20 m and relative velocity from 0–30 m/s are shown. CI values within 0–10 are obtained depending on the range and relative closing velocity values. High CI values are obtained for distances closer to the vehicle. For the same distance, higher velocities reflect higher CI values.

Figure 5:
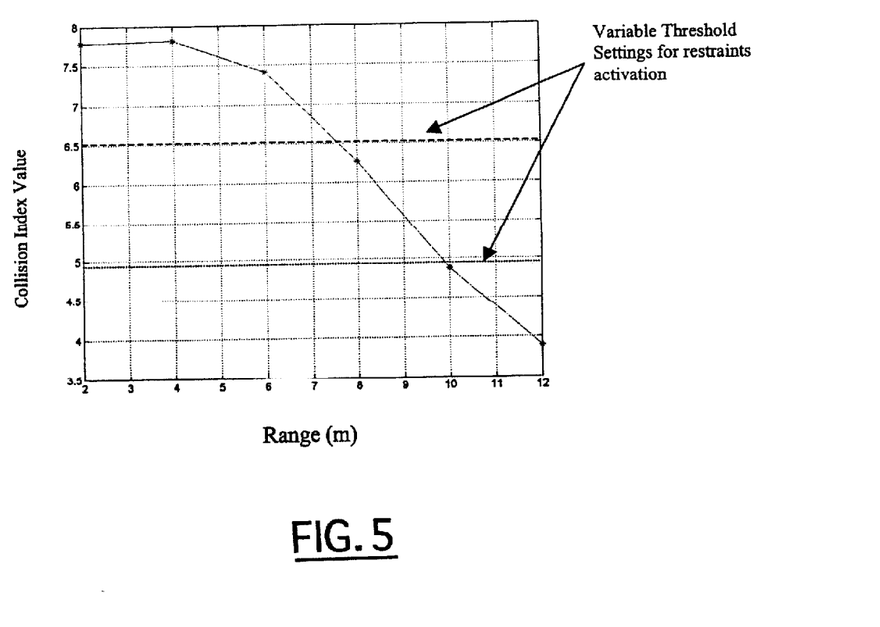
FIG. 5 is an example plot of the predictive impact estimator collision index values for a fixed velocity and variable range to a detected object.

Referring now to FIG. 5 there is shown a graph of PIE CI values for a fixed velocity of 14 m/s in a range from 2 to 12 meters. As can be seen in FIG. 4, as the closer the range to the detected object, the higher the CI value for a given velocity. The CI value generated by the PIE 14 and the corresponding LD value are communicated to the PCM 16.

The PCM 16 coordinates manipulation of the active resettable pretensioner system 22 and communicates the activation status to a backup system and related restraint system components 17 by way of the accelerometer based restraint control module 15.

Figure 6:
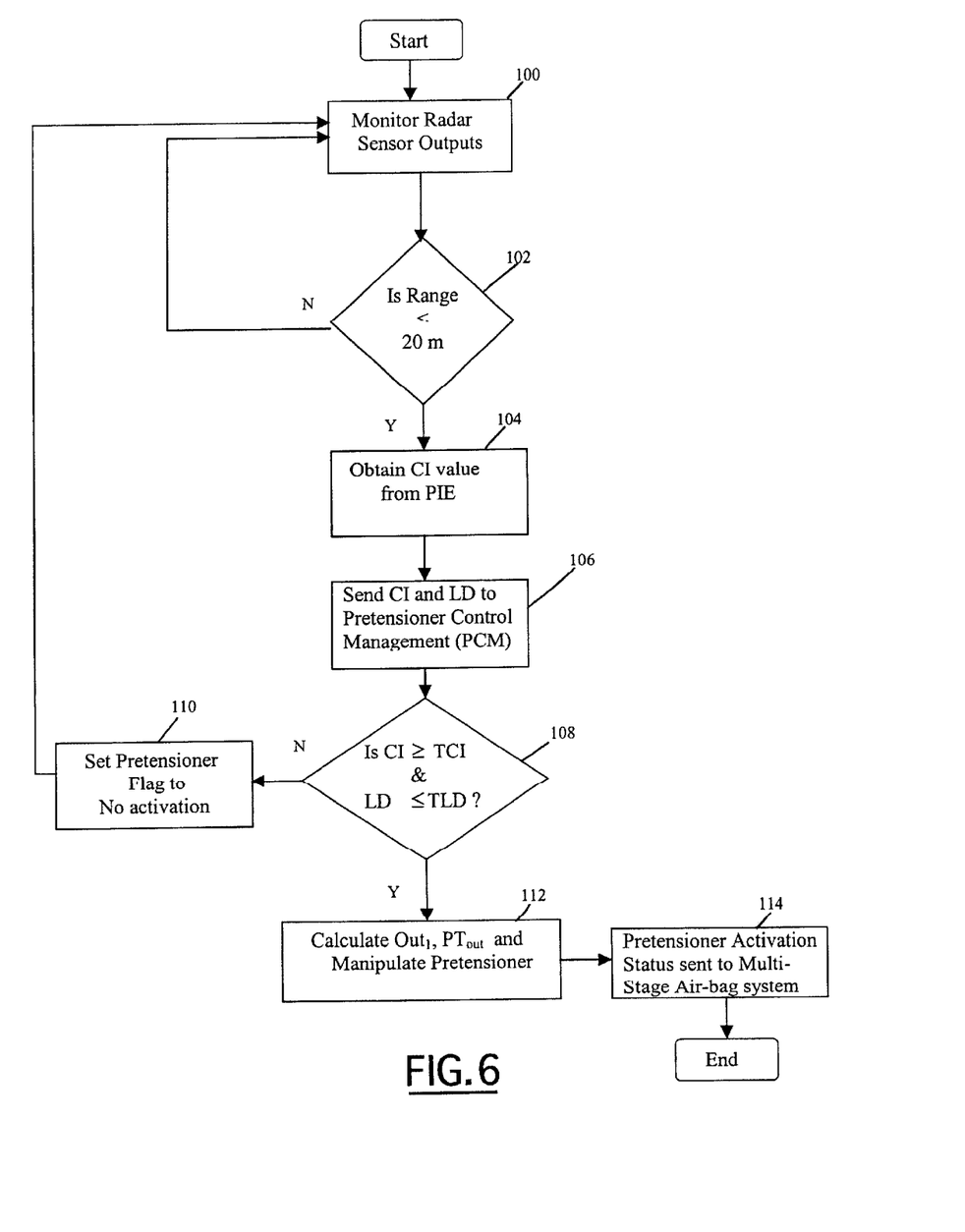
FIG. 6 is a logic flow diagram of one method of pre-crash occupant position control according to an embodiment of the present invention.

Referring now to FIG. 6 there is shown a logic flow diagram of one control method for the PCM 16 according to the present invention. The logic routine begins in step 100 by monitoring the radar sensing system 18 outputs continuously until an object is detected within the desired range in step 102.

At such time, the PIE 14 generates a CI value as discussed above in step 104 and communicates the CI and LD values to the PCM 16 in step 106. The CI and LD values obtained from the PIE 14 are compared to threshold values (TCI) and (TLD), respectively, in step 108 and, if the conditional checks are not satisfied, the pretensioner system is not activated in step 110. Otherwise, in step 112, output signals are determined as discussed below and the pretensioner is manipulated. The activation status of the pretensioner system is also communicated to the vehicle restraint control module along with the CI value to assist in decision-making for multi-stage airbag activation in the event that collision occurs.

Equations governing variables of the PCM logic routine in steps 108 through 112 are given by:

$$TCI_{stat} = \begin{cases} 1 \text{ if } CI \geq TCI \\ 0 \text{ if } CI < TCI \end{cases} \quad (1)$$

$$TLD_{stat} = \begin{cases} 1 \text{ if } LD \geq TLD \\ 0 \text{ if } LD < TLD \end{cases} \quad (2)$$

$$Out_1 = G_1 \times CI \times \left(\frac{W_o}{W_{REF}}\right)\left[1 - e^{\frac{-T}{B}}\right] \quad (3)$$

$$PT_{out} = \begin{cases} max\_pt & \text{for } Out_1 > max\_pt \\ Out_1 & \text{for } min\_pt \geq |Out_1| \leq max\_pt \\ -max\_pt & \text{for } Out_1 < -max\_pt \\ 0 & \text{for } |Out_1| < min\_pt \end{cases} \quad (4)$$

where:

$TCI_{stat}$: is the Collision Index Threshold status $TLD_{stat}$: is the relative Lateral Displacement Status CI: is the Collision Index $W_o$: is the occupant weight $W_{ref}$: is the occupant weight threshold $G_1$: is the radar input sensitivity gain T: Time B: Out_1 response time constant $Out_1$: is the calculated output min_pt: is the minimum allowed output to the resettable pretensioner max_pt: is the maximum allowed output to the resettable pretensioner $PT_{out}$: is the output sent to the resettable pretensioner The threshold conditions for the CI and LD are given by equations (1) and (2), respectively. The reliability of the object detecting system which, in this example, is a radar system, is taken into account by the gain $G_1$ in equation (3). Also, the manipulating signal sent to the pretensioner system is dynamically regulated by accounting for the occupant weight ($W_o$) and by incorporating an adjustable PCM output response time (B). The threshold for activating the pretensioner is tunable based upon the CI value to minimize nuisance manipulation, and to govern which safety devices to deploy before and/or after the collision occurs.

Figure 7:
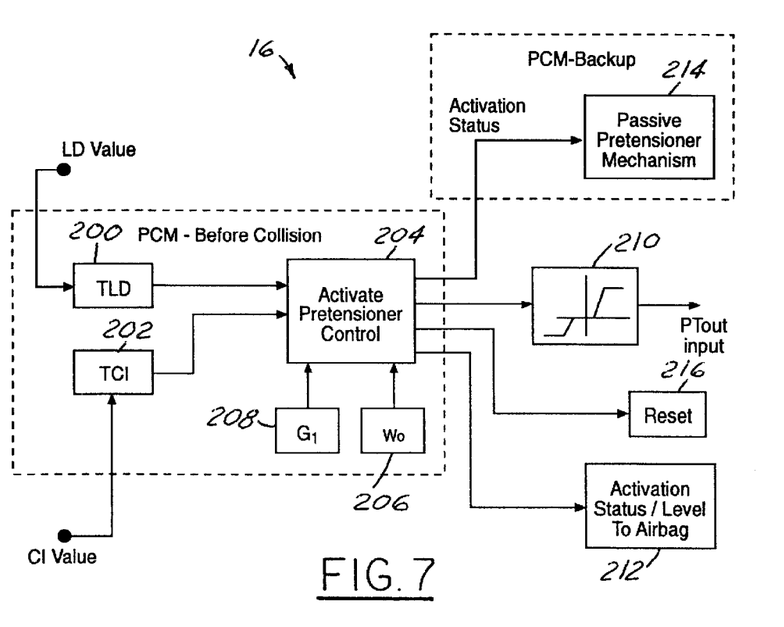
FIG. 7 is a functional block diagram of the pretensioner control management system of FIG. 1.

Referring now to FIG. 7 there is shown a functional block diagram of the PCM 16. The PCM 16 receives the LD value and CI value from the PIE 14 and compares them to respective threshold values in blocks 200 and 202. Equations (1) through (3) are then analyzed in block 204 as part of the active pretensioner control system taking into account the occupant weight in block 206 and the detection system sensitivity gain in block 208. The pretensioner output ($PT_{out}$) from block 210 is then communicated to the resettable pretensioner for activation. The activation status of the pretensioner is communicated to the airbag restraint control module in block 212 along with the CI value to assist in decision-making for multi-stage airbag activation in the event collision occurs. The activation status of the resettable pretensioner is also sent to the backup passive pretensioner in block 214 to provide improved system reliability and robustness. If the LD and CI value threshold conditions are not met, the pretensioner system is reset in block 216 to indicate that no pretensioner activity is desired.

From the foregoing, it will be seen that there has been brought to the art a new system and method for robust occupant position control prior to vehicle impact which has advantages over conventional safety restraint systems. While the invention has been described in connection with one or more embodiments, it will be understood that the invention is not limited to those embodiments. On the contrary, the invention covers all alternatives, modifications and equivalents as may be included within the spirit and scope of the appended claims.

What is claimed is:

1. A seatbelt pretensioner method for occupant position control prior to vehicle impact comprising, in response to detecting an object:

generating a Collision Index (CI) value representing a likelihood of collision with said detected object;

generating a Lateral Displacement (LD) value indicative of a distance to said detected object;

determining a weight value ($W_o$) for a vehicle occupant; and when said CI and LD values satisfy respective threshold conditions, generating a pretensioner output ($PT_{out}$) value as a function of said CI and $W_o$ values, and activating a reversible seatbelt pretensioner associated with a seat of said vehicle occupant as a function of said $PT_{out}$, and wherein generating a $PT_{out}$ value includes determining a response time constant of said seatbelt pretensioner and generating said $PT_{out}$ value as a function of said response time constant.

2. A method according to claim 1 wherein generating a CI value includes receiving a closing speed value and distance value to said detected object from an object detection system and generating said CI value as a function of said closing speed and distance values.

3. A method according to claim 2 wherein generating a $PT_{out}$ value includes receiving a sensitivity value from said object detection system and generating said $PT_{out}$ value as a function of said sensitivity value.

4. A method according to claim 2 wherein said object detection system comprises at least one of a radar, lidar, or vision system.

5. A method according to claim 1 further comprising communicating said $PT_{out}$ and CI values to a restraints controller for activating a multi-stage air-bag in the event of a collision with said detected object.

6. A seatbelt pretensioner method for occupant position control prior to vehicle impact comprising, in response to detecting an object:

generating Collision Index (CI) value representing a likelihood of collision with said detected object;

generating a Lateral Displacement (LD) value indicative of a distance to said detected object;

determining a weight value ($W_o$) for a vehicle occupant; and when said CI and LD values satisfy respective threshold conditions, generating a pretensioner output ($PT_{out}$) value as a function of said CI and $W_o$ values, and activating a reversible seatbelt pretensioner associated with a seat of said vehicle occupant as a function of said $PT_{out}$, and wherein generating a $PT_{out}$ value includes generating an output value ($Out_1$) according to the following equation:

$$Out_1 = G_1 * CI * (W_o/W_{ref})[1 - e^{-T/B}]$$

wherein $G_1$ represents an object detecting system sensitivity value, $W_{ref}$ represents an occupant weight threshold, and B represents a response time constant desired for said seatbelt pretensioner.

7. A method according to claim 6 wherein activating a seatbelt pretensioner includes:

when $Out_1$ exceeds a maximum pretensioner value, transmitting a maximum $PT_{out}$ value to said seatbelt pretensioner; and when $Out_1$ is between a minimum pretensioner value and said maximum pretensioner value, transmitting said $Out_1$ value to said seatbelt pretensioner.

8. A seatbelt pretensioning system for a vehicle activated prior to impact comprising:

an object detector for providing a speed and lateral distance (LD) value to a detected object;

a weight sensor associated with an occupant seat for providing an occupant weight value ($W_o$);

a seatbelt pretensioner responsive to a pretensioner control signal ($PT_{out}$) for tensioning a seat belt associated with said occupant seat;

a Predictive Impact Estimator (PIE) to generate a Collision Index (CI) value as a function of said speed and LD values; and a Pretensioner Control Module (PCM) to receive said CI and $W_o$ values, generate said $PT_{out}$ value as a function of said CI and $W_o$ values and a response time constant of said seatbelt pretensioner, and communicate said $PT_{out}$ value to said seatbelt pretensioner.

9. A system according to claim 8 wherein said object detector includes a radar system.

10. A system according to claim 8 wherein said object detector includes a lidar system, or vision system.

11. A system according to claim 8 wherein said PCM receives said distance value (LD) and generates said $PT_{out}$ value as a function of said CI, $W_o$ and LD values.

12. A system according to claim 8 comprising a restraints controller for activating an air-bag in the event of a collision with said detected object, and wherein said PCM communicates said $PT_{out}$ and CI values to said restraints controller.

13. A seatbelt pretensioning system for a vehicle activated prior to impact comprising:

an object detector for providing a speed and lateral distance (LD) value to a detected object;

a weight sensor associated with an occupant seat for providing an occupant weight value ($W_o$);

a seatbelt pretensioner responsive to a pretensioner control signal ($PT_{out}$) for tensioning a seat belt associated with said occupant seat;

a Predictive Impact Estimator (PIE) to generate a Collision Index (CI) value as a function of said speed and LD values; and a Pretensioner Control Module (PCM) to receive said CI and $W_o$ values, generate said $PT_{out}$ value as a function of said CI and $W_o$ value, and communicate said $PT_{out}$ value to said seatbelt pretensioner, and wherein said PCM includes logic operative to generate said $PT_{out}$ value as a function of an output value ($out_1$) according to the following equation:

$$Out_1 = G_1 * CI * (W_o/W_{ref})[1-e^{-T/B}]$$

wherein $G_1$ represents an object detecting system sensitivity value, $W_{ref}$ represents an occupant weight threshold, and B represents an output response time constant for said seatbelt pretensioner.

14. A system according to claim 13 wherein:

when $Out_1$ exceeds a maximum pretensioner value, said PCM is adapted to communicate a maximum $PT_{out}$ value to said seatbelt pretensioner; and when $Out_1$ is between a minimum pretensioner value and said maximum pretensioner value, said PCM is adapted to communicate said $Out_1$ value to said seatbelt pretensioner.

15. A seatbelt pretensioning system for a vehicle activated prior to impact comprising:

an object detector for providing a closing speed and distance value to a detected object;

a weight sensor associated with an occupant seat for providing an occupant weight value ($W_o$);

a seatbelt pretensioner responsive to a pretensioner control signal ($PT_{out}$) for tensioning a seat belt associated with said occupant seat said seatbelt pretensioner having an associated response time constant; and a controller including logic programmed to:

generate a Collision Index (CI) value as a function of said closing speed and distance values;

when said CI and LD values satisfy respective threshold conditions, generates said $PT_{out}$ value as a function of said CI and $W_o$ values and said response time constant; and communicate said $PT_{out}$ value to said seatbelt pretensioner.

16. A system according to claim 15 wherein said controller includes logic adapted to receive a sensitivity value from said object detection system and generate said $PT_{out}$ value as a function of said sensitivity value.

17. A system according to claim 15 wherein said object detector is a radar, lidar, or vision system.

* * * * *